July 8, 1924.

H. BACHARACH

GAUGE

Filed March 6, 1922

1,500,790

2 Sheets-Sheet 1

INVENTOR

Herman Bacharach by James C. Bradley
atty.

July 8, 1924.

H. BACHARACH

GAUGE

Filed March 6, 1922

1,500,790

2 Sheets-Sheet 2

INVENTOR
Herman Bacharach
by
James C. Bradley
atty

Patented July 8, 1924.

1,500,790

UNITED STATES PATENT OFFICE.

HERMAN BACHARACH, OF PITTSBURGH, PENNSYLVANIA, ASSIGNOR TO BACHARACH INDUSTRIAL INSTRUMENT COMPANY, A CORPORATION OF PENNSYLVANIA.

GAUGE.

Application filed March 6, 1922. Serial No. 541,365.

*To all whom it may concern:*

Be it known that I, HERMAN BACHARACH, a citizen of the United States, and a resident of Pittsburgh, in the county of Allegheny and State of Pennsylvania, have made a new and useful Invention in Gauges, of which the following is a specification.

Figure 1:
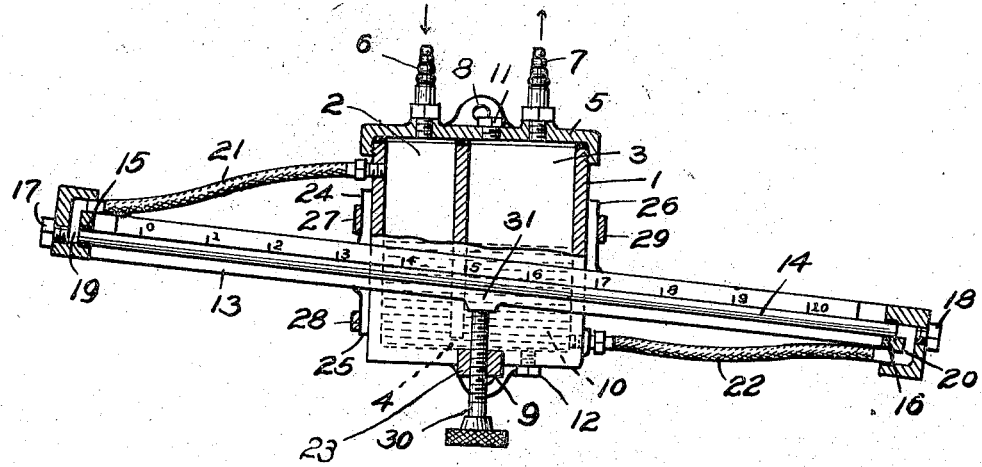
Figure 2:
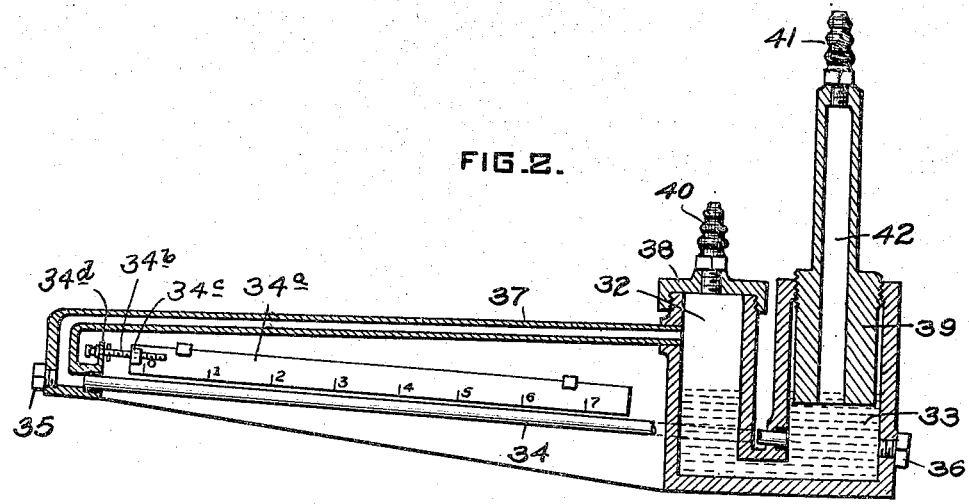
Figure 3:
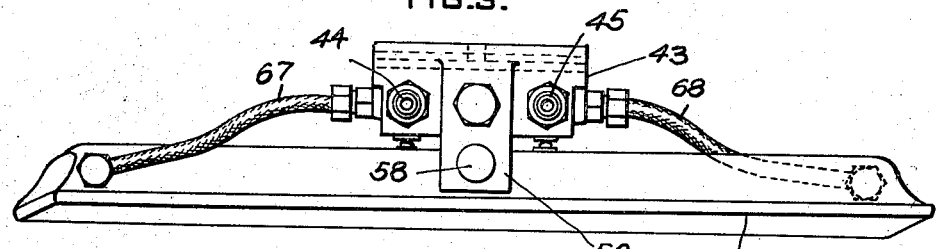
Figure 4:
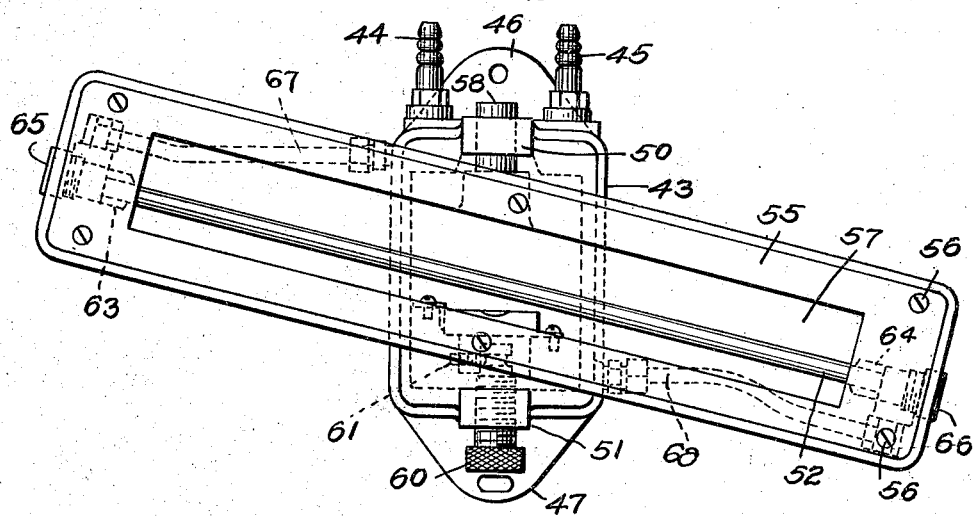
Figure 5:
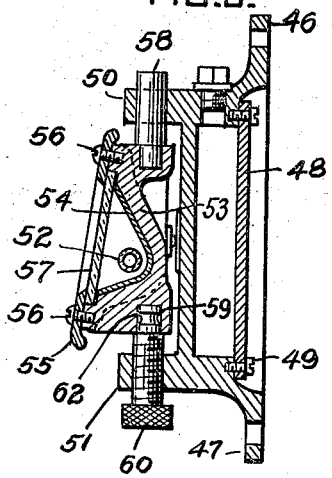

The invention relates to gauges of the type having an inclined gauge tube or glass, and has for its primary object the provision of an improved construction, (1) permitting the ready adjustment of the level of the liquid in the glass without the use of stuffing boxes or other complicated devices, (2) wherein convenient provision is made for filling and draining the gauge, (3) in which the pressure connections are arranged relatively near to each other, making such connections simpler and neater in appearance, (4) which permits the use of a straight commercial glass tube instead of the bent tube commonly employed in inclined gauges, and (5) which permits the use of one model or form for a plurality of gauges all having the same inclination of the glass but which have different measuring ranges, thus cheapening the construction and improving the appearance where a series of gauges of varying range are used together. Certain embodiments of the invention are illustrated in the accompanying drawings wherein:

Figure 1 is a diagrammatic view partially in section and partially in front elevation illustrating the general arrangement and principle of the construction. Fig. 2 is a view similar in character to that of Fig. 1 but showing a modification. And Figs. 3, 4 and 5 are plan, front and sectional views respectively of the gauge of Fig. 1 embodied in commercial form, as opposed to the diagrammatic showing of Fig. 1.

Referring to Fig. 1, 1 is a casing provided with a pair of pressure chambers or legs 2 and 3 communicating at their lower ends through the passage 4 and provided with the screw closure or cap 5 carrying the connections 6 and 7 for the pressures whose difference is to be measured. The casing is provided with a pair of perforated lugs 8 and 9 by means of which it may be secured in position upon a wall or instrument board or panel. The casing carries an indicating liquid 10, such as mercury or oil and is provided with supply and drainage passages, normally closed by the screw members 11 and 12.

Extending transversely of the casing 1 is the frame 13 in which is mounted the gauge glass or tube 14, such glass being packed in the ends of the frame by means of suitable gaskets 15 and 16. The tube is made straight and openings are provided in the frame in alinement with the tube so that the tube may be readily positioned or removed by moving it endwise. These openings are normally closed by the screw plugs 17 and 18. The ends of the frame are also provided with the lateral passages 19 and 20 communicating at their inner ends with the passage through the gauge tube, and at their outer ends with the flexible tubes 21 and 22 leading into the chambers 2 and 3 respectively as shown in the drawing.

In order to permit the adjustment of the level of the liquid in the gauge glass to bring the level of the upper end to the zero point on the scale, the frame 13 carrying the gauge glass is made adjustable relative to the casing 1. To guide the frame in its vertical movement and maintain the angle of inclination, the guide bars 24, 25 and 26 on the frame are employed working in the guide loops 27, 28 and 29 on the casing 1. The adjustment is accomplished by the thumb screw 30 threaded through a suitable lug 23 on the casing 1 and swivelled at its upper end in the lug 31 carried by the gauge frame 13.

The advantages of the foregoing construction will be readily apparent. The level of the liquid in the gauge glass may be easily adjusted by means of the screw 30 and there are no parts requiring replacement. It is of course immaterial whether the glass is moved vertically or the pressure chambers, although the preferred construction is the one illustrated in which the adjusting movement is given to the gauge glass. The construction involving the use of the frame 13 with the openings in line with the glass permits the use of a straight gauge glass which is more readily obtainable than a tube having curved ends and is much cheaper and more easily handled in making replacements and in assembling the apparatus. The use of the chambers 2 and 3 with the filling and drainage passages is advantageous, as compared with apparatus in which the inlet passages, such as the passages 6 and 7, are used for filling and draining since the filling and drainage may be accomplished without disturbing the pipe connections to the parts 6 and 7. The use of the chambers with the connections 6 and 7 relatively close together rather than at the opposite ends of the device also presents a detail of improvement, since the appearance of the apparatus is improved by the use of connections which are close together and in parallelism as opposed to an arrangement in which the connections are spaced apart and extend in opposite directions. A manufacturing advantage is also involved in the use of the pressure chambers 2 and 3, one or both of which has its interior accessible with a closure therefor, since one set of castings can be changed to give a wide variation in the range of the gauge while still maintaining the glass at the one angle of inclination. This is accomplished by boring out one or both of the chambers with varying cross sectional areas, (or by the means hereinafter shown in connection with Fig. 2), the effect of such changes upon the range of movement of the liquid in the glass being fully set forth in my application Serial No. 452,278, filed March 14, 1921. In this way, one set of castings may be utilized for gauges of different ranges, so that the cost of patterns is reduced in producing a line of gauges of different ranges, and the appearance of the set improved where a number of gauges are used on the same instrument board since they are all similar in appearance and all have the same inclination of the glasses.

Fig. 2 illustrates a modification involving a somewhat cheaper, simpler construction in which the chambers 32 and 33 are at one end of the glass 34, with the chamber 33 somewhat in advance of the chamber 32, so that the gauge glass may pass to the front of the chamber 32 and enter the chamber 33 without passing through the chamber 32. As in the other type of device the glass is made straight and is readily removable by reason of the openings in the frame in alinement with the glass and closed by the screw plugs 35 and 36. The glass 34 lies in front of the chamber 32 and opens directly into the chamber 33, while the chamber 32 is connected to the other end of the glass by means of the tube 37. The chamber 32 has a screw closure cap 38, while the chamber 33 is closed by the plug 39. Such plugs might also be used in the Fig. 1 construction, in place of the closure 5, in order to give varying areas in the chambers. Plus and minus pressures are applied to the chambers 32 and 33 respectively through the connections 40 and 41. The effective cross sectional area of the chamber 33 is reduced by the plug 39 to that of the passage 42 through the plug, so that the range of movement of the liquid in the glass per unit of difference in pressures to be measured is correspondingly reduced. If a plug having a passage of increased cross sectional area is used the range of movement is increased. This is merely another expedient for accomplishing the function explained in connection with the Fig. 1 construction, by boring out the chambers with varying cross sectional areas, whereby the range of the gauges may be varied while still using the one set of castings, and while maintaining the angle of inclination of the glass.

A further feature of improvement is the making of the scale $34^a$ slidable longitudinally so as to secure an adjustment of the zero point to take care of variations in the volume of liquid in the gauge and any losses which may occur. To accomplish this function, the screw $34^b$ is swivelled in the bracket $34^d$ and engages a nut $34^c$ carried by the end of the scale.

Figs. 3, 4 and 5 illustrate the embodiment of the diagrammatic construction of Fig. 1 in a commercial form of gauge. As here shown, 43 is the casing containing a pair of pressure chambers to which plus and minus pressures are applied through the connections 44 and 45. This casing is provided with the flanges 46 and 47 having suitable perforations for the passage of screws for securing the device to an instrument board. Access is secured to the back of the chambers instead of to the top as in the construction of Fig. 1, a back plate 48 secured by the screws 49 acting as a closure for the chambers. The casing 43 is also provided with a pair of forwardly projecting lugs 50 and 51, the lug 50 being smooth bored vertically and the lug 51 screw threaded.

The frame for supporting the gauge glass 52 comprises a casting 53 having its face recurved as indicated in Fig. 5 and carrying the scale plate 54, the front plate 55 held to the casting 53 by the screws 56, and the window 57 clamped between the casting 53 and the front plate 55. Scales are preferably provided on both the upper and lower flanges of the scale plate 54 which makes the gauge easy to read from above or below.

The upper side of the casting 53 is provided with a guide pin 58 slidably mounted in the lug 50, while the lower side thereof is provided with a recess 59 in which is swivelled the upper end of the adjusting screw 60, such screw being threaded through the lug 51. The swivelling is accomplished by means of a screw 61 (Fig. 4) which engages the groove 62 in the end of the screw. The ends of the gauge glass are packed by means of the gaskets 63 and 64, and the glass is removable through openings in the end of the casting 53 in alinement with the glass, such openings being closed by the screw plugs 65 and 66. The ends of the gauge glass are connected with the chambers in the casing 43 by means of the flexible tubes 67 and 68 (Fig. 3).

What I claim is:

1. In combination in a gauge, a pair of communicating pressure chambers containing a liquid and an inclined gauge glass mounted for relative vertical movement, means for holding the chambers and glass in their various positions of relative adjustment, a connection from one chamber above the level of the liquid to the upper end of the glass, and a connection from the other chamber below the level of the liquid to the lower end of the glass.

2. In combination in a gauge, a pair of communicating pressure chambers containing a liquid and an inclined gauge glass mounted for relative vertical movement, adjusting means for securing said relative movement, a connection from one chamber above the level of the liquid to the upper end of the glass, and a connection from the other chamber below the level of the liquid to the lower end of the glass.

3. In combination in a gauge, a casing comprising a pair of communicating pressure chambers containing a liquid, an inclined gauge glass slidably mounted on the casing for vertical movement, a screw adjusting means for securing said movement, a connection from one chamber above the level of the liquid to the upper end of the glass, and a connection from the other chamber below the level of the liquid to the lower end of the glass.

4. In combination in a gauge, a casing comprising a pair of communicating pressure chambers closely adjacent and containing a liquid, plus and minus pressure connections to said chambers, an inclined gauge glass extending transversely of the chambers and supported by the casing, a connection from one chamber above the level of the liquid to the upper end of the glass, and a connection from the other chamber below the level of the liquid to the lower end of the glass.

5. In combination in a gauge, a casing comprising a pair of communicating pressure chambers, side by side and containing a liquid, a pair of connections for the plus and minus pressures to be measured leading into the chambers respectively, an inclined gauge glass extending transversely of the chambers and supported by the casing, a connection from one chamber above the level of the liquid to the upper end of the glass, and a connection from the other chamber below the level of the liquid to the lower end of the glass.

6. In combination in a gauge, a pair of communicating pressure chambers open at the top to give access thereto to permit of changes in the cross sectional area thereof, a closure for said ends, a liquid in said chambers, connections to said chambers above the surface of the liquid for applying plus and minus pressures to the liquid in said chambers, an inclined gauge glass extending transversely of the chambers, a connection from one chamber above the level of the liquid to the upper end of the glass, and a connection from the other chamber below the level of the liquid to the lower end of the glass.

7. In combination in a gauge, a pair of communicating pressure chambers closely adjacent and containing a liquid, plus and minus pressure connections to said chambers, an inclined gauge glass extending transversely of the chambers, a connection from one chamber above the level of the liquid to the upper end of the glass, a connection from the other chamber below the level of the liquid to the lower end of the glass, inlet and drainage passages for the liquid independent of said connections, and removable closures for said passages.

8. In combination in a gauge, a casing, an inclined gauge glass subtantially straight from end to end, a supporting frame for the glass receiving the ends of the glass and having an opening in one end in alinement with the glass to permit the removal or insertion thereon, a removable closure for the opening, a liquid in the casing in communication with the glass, and connections through the ends of said frame for the application of the fluid pressure to be measured.

9. In combination in a gauge, a casing, an inclined gauge glass substantially straight from end to end, a supporting frame for the glass receiving the ends of the glass and having an opening in each end in alinement with the glass to facilitate the removal or insertion of the glass, removable closures for said openings, a liquid in the casing in communication with the glass, and connections through the ends of said frame for the application of the fluid pressures to be measured.

10. In combination in a gauge, a pair of communicating pressure chambers closely adjacent, containing a liquid and provided with connections for the pressures whose difference is to be measured, an inclined gauge glass substantially straight from end to end, a supporting frame for the glass receiving the ends of the glass and having an opening in one end in alinement with the glass to permit its removal or insertion, a removable closure for the opening, and connections from the chambers to the ends of the frame and communicating with the ends of the glass.

11. In combination in a gauge, a casing comprising a pair of communicating pressure chambers, side by side and containing a liquid, a pair of connections for the plus and minus pressures to be measured leading to the chambers, an inclined gauge glass extending transversely of the chambers, a connection from one chamber above the level of the liquid to the upper end of the glass, and a connection from the other chamber below the level of the liquid to the lower end of the glass, the said casing being located substantially midway between the ends of the gauge glass.

HERMAN BACHARACH.